United States Patent
Prabagaren

(10) Patent No.: US 11,870,697 B2
(45) Date of Patent: *Jan. 9, 2024

(54) METHODS AND SYSTEMS FOR PARALLEL PROCESSING OF BATCH COMMUNICATIONS DURING DATA VALIDATION

(71) Applicant: Capital One Services, LLC, McLean, VA (US)

(72) Inventor: Gokul Prabagaren, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/155,111

(22) Filed: Jan. 17, 2023

(65) Prior Publication Data

US 2023/0155939 A1 May 18, 2023

Related U.S. Application Data

(63) Continuation of application No. 17/514,816, filed on Oct. 29, 2021, now Pat. No. 11,558,300.

(51) Int. Cl.
*H04L 47/12* (2022.01)
*H04J 3/06* (2006.01)

(52) U.S. Cl.
CPC ............ *H04L 47/12* (2013.01); *H04J 3/0661* (2013.01)

(58) Field of Classification Search
CPC .. G06F 9/542; G06F 16/24568; G06F 16/182; G06F 16/21; G06F 16/215; G06F 16/2433; G06F 16/24532; G06F 16/248; G06F 16/278; G06F 16/285; G06F 16/9024; G06F 16/90335; G06F 8/35; G06F 16/2246; G06F 16/2477; G06F 16/256; G06F 16/27; G06F 16/951; G06F 16/128; G06F 16/1734; G06F 16/1805; G06F 16/2282; G06F 16/2358; G06F 16/2379; G06F 16/2386; G06F 16/2456;
(Continued)

(56) References Cited

U.S. PATENT DOCUMENTS

2019/0171650 A1* 6/2019 Botev ................. G06F 16/2358
2019/0317949 A1* 10/2019 Florissi ............... G06F 16/2471
(Continued)

*Primary Examiner* — Djenane M Bayard
(74) *Attorney, Agent, or Firm* — Perkins Cole LLP

(57) ABSTRACT

Methods and systems for parallel processing of batch communications during data validation using a plurality of independent processing streams. For example, the system may receive a plurality of communications for batch processing during a predetermined time period. The system may process, with a batch configuration file, a first alphanumeric data string of a first communication of the plurality of communications. The system may process, with the batch configuration file, a second alphanumeric data string of a second communication of the plurality of communications. The system may direct the first communication to a first micro-batch for processing within the predetermined time period based on the first metadata tag, wherein the first micro-batch is processed using a first validation and enrichment protocol and a first micro-batch configuration file, wherein the first validation and enrichment protocol and the first micro-batch configuration file are specific to the first source.

19 Claims, 5 Drawing Sheets

(58) Field of Classification Search
CPC ...... G06F 16/273; G06F 16/289; G06F 9/546; G06F 16/2471; G06F 16/252; G06F 2009/45595; G06F 9/45558; G06F 9/5033; G06F 9/5072; G06F 9/5077; G06F 16/24554; G06F 16/24556; G06F 16/9017; G06F 18/2155; G06F 21/602; G06F 21/6245; G06F 21/6254; G06F 21/78; G06F 9/4881; G06F 9/5038; G06F 9/505; G06F 9/5083; G06F 9/52; G06F 9/541; H04L 67/10; H04L 67/12; H04L 47/12; H04L 67/1097; H04L 2463/121; H04L 47/70; H04L 63/0209; H04L 63/0407; H04L 9/0637; H04L 9/12; H04L 9/3239; H04L 9/3297; H04L 9/50; H04L 2209/42; H04L 67/1023; H04L 67/566; H04L 9/008; H04L 9/0825; H04L 9/0844; H04L 9/0866; H04L 9/3247; H04L 49/3018; H04L 49/3045; H04L 49/506; H04L 67/289; H04L 67/34; H04L 63/0428; H04L 69/22; H04L 9/00; H04L 9/32; H04L 1/0043; H04L 1/0052; H04L 1/0076; H04L 43/065; H04L 47/10; H04L 47/11; H04L 47/20; H04L 47/621; H04L 49/901; H04L 51/02; H04L 63/04; H04L 63/12; H04L 65/60; H04L 65/762; H04L 67/01; H04L 67/1008; H04L 67/104; H04L 67/1095; H04L 67/2876; H04L 67/63; H04L 69/162; H04L 9/0631; H04L 9/0838; H04L 2209/56; H04L 41/046; H04L 41/0806; H04L 41/0843; H04L 41/0895; H04L 41/12; H04L 41/40; H04L 43/028; H04L 43/0894; H04L 49/25; H04L 61/4511; H04L 61/5014

See application file for complete search history.

(56) References Cited

U.S. PATENT DOCUMENTS

2021/0334251 A1\* 10/2021 Mire .................. G06F 16/221
2022/0383084 A1\* 12/2022 Lamy-Poirier ..... G06F 18/2155

\* cited by examiner

METHODS AND SYSTEMS FOR PARALLEL PROCESSING OF BATCH COMMUNICATIONS DURING DATA VALIDATION

CROSS-REFERENCE TO RELATED APPLICATIONS

This application is a continuation of U.S. patent application Ser. No. 17/514,816, filed on Oct. 29, 2021. The contents of which are hereby incorporated by reference in its entirety.

BACKGROUND

In recent years, electronic communications, particularly those related to user record data has increased exponentially. In many instances, these communications may include processing request and/or transactions that require processing by one or more components along a network. As these communications are necessarily handled in a serial manner, a slowdown or failure at one point along the network may create a bottleneck for further communications.

SUMMARY

Accordingly, methods and systems are described for relieving and/or preventing bottlenecks for communications that are processed in a serial nature along a network. In particular, these methods and systems are applicable to communications (e.g., transactions requiring validation from one or more sources) that are handled through batch processing. Specifically, the methods and systems describe sorting and directing communications within a batch to different micro-batches based on the source of the communication. By doing so, the system relieves bottlenecks that may be caused during data validation of the communications in the batch due to missing data, non-compliant terms, varying formats, etc.

Furthermore, the methods and systems achieve this technical benefit through an unconventional mechanism, namely the use of a configuration file to process a first alphanumeric data string of a first communication of the plurality of communications in order to determine source of the communication, determine a time stamp for the communication that corresponds to the initial batch, and generate a metadata tag for the communication, wherein the metadata tag indicates that the communication corresponds to the source and the time stamp. Notably, the metadata tag does not modify underlying data in the communication and therefore does not risk further corruption of the data. The determination of the source allows for the system to direct the communication to a micro-batch specific for the source of that communication. In particular, the system may then apply validation and enrichment protocols that are specific to the source as well as access information specific to the source and/or parameters configured for processing data related to that source.

Furthermore, the determination of the time stamp, allows the system to correlate the communication (now processed in a micro-batch) to the original batch of communications and/or any time period or deadline for the batch processing related to that original batch. As such, the communication (and all other communications in the batch) are able to be processed in parallel and avoid the potential for bottlenecks.

In some aspects, methods and systems for parallel processing of batch communications during data validation using a plurality of independent processing streams are described. For example, the system may receive a plurality of communications for batch processing during a predetermined time period. The system may process, with a batch configuration file, a first alphanumeric data string of a first communication of the plurality of communications, wherein the batch configuration file: determines that the first communication is received from a first source; determines a first time stamp for the first communication that corresponds to the predetermined time period; and generates a first metadata tag for the first communication, wherein the first metadata tag indicates that the first communication corresponds to the first source and the first time stamp. The system may process, with the batch configuration file, a second alphanumeric data string of a second communication of the plurality of communications, wherein the batch configuration file: determines that the second communication is received from a second source; determines a second time stamp for the second communication that corresponds to the predetermined time period; and generates a second metadata tag for the second communication, wherein the second metadata tag indicates that the second communication corresponds to the second source and the second time stamp. The system may direct the first communication to a first micro-batch for processing within the predetermined time period based on the first metadata tag, wherein the first micro-batch is processed using a first validation and enrichment protocol and a first micro-batch configuration file, wherein the first validation and enrichment protocol and the first micro-batch configuration file are specific to the first source. The system may direct the second communication to a second micro-batch for processing within the predetermined time period based on the second metadata tag, wherein the second micro-batch is processed using a second validation and enrichment protocol and a second micro-batch configuration file, wherein the second validation and enrichment protocol and the second micro-batch configuration file are specific to the second source.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention. To do this, the system uses a configuration file to sort transactions that typically include alphanumeric data string encoded in proprietary formats without modifying the underlying data.

Figure 1:
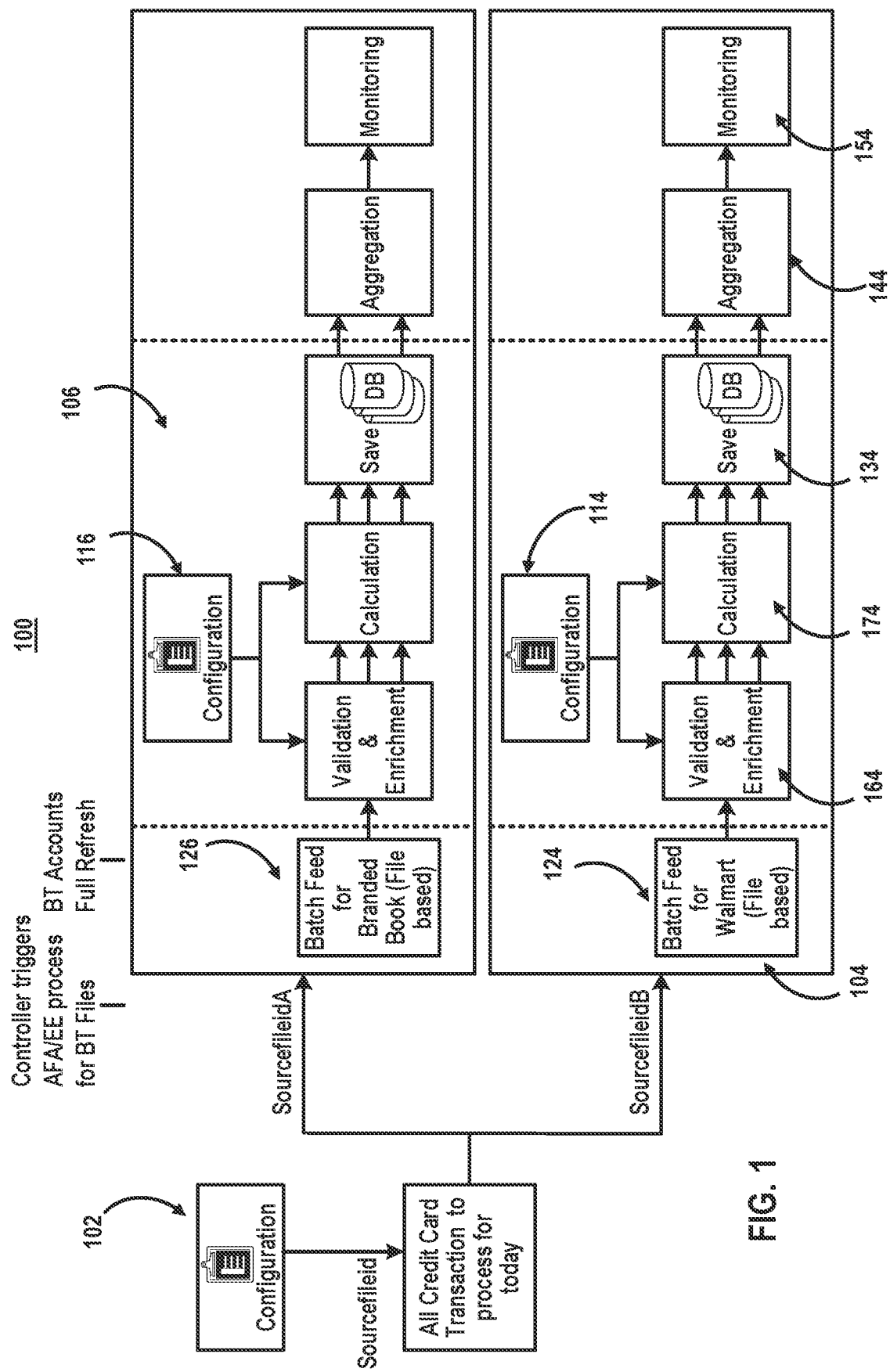
FIG. 1 shows an illustrative architecture for parallel processing of batch communications during data validation, in accordance with one or more embodiments.

FIG. 1 shows an illustrative architecture for parallel processing of batch communications during data validation, in accordance with one or more embodiments. For example, FIG. 1 shows system 100, which comprises a system for parallel processing of batch communications during data validation using a plurality of independent processing streams. For example, the system may use a configuration file to separate an original batch of credit card transaction data into different pipelines based a source of the credit card transaction. By separating the transactions into separate pipelines, the system reduces bottlenecks when assessing rewards when processing the transactions.

As shown in FIG. 1, system 100 include a batch configuration file 102. As shown in FIG. 1, batch configuration file 102. Batch configuration file 102 may process communications (e.g., credit card transactions for processing on a given day). Batch configuration file 102 may process the plurality of communications to generate a metadata tag (e.g., a sourcefieldID) that both indicates a source of the communication and a time stamp (e.g., corresponding to the day or other time period during which the communication was received).

Batch configuration file 102 may generate a first sourcefieldID and a second sourcefieldID corresponding to a first and second communication, respectively. Based on the first sourcefieldID, the first communication is directed to the first processing pipeline or workflow (e.g., pipeline 104). Based on the second sourcefieldID, the second communication is directed to the second processing pipeline or workflow (e.g., pipeline 106). At pipeline 104, the first communication is directed to a first micro-batch (e.g., micro-batch 124) where a first micro-batch processing unit is configured to process, with a first micro-batch configuration file (e.g., micro-batch configuration file 114) and a first validation and enrichment protocol (e.g., via processing unit 164), the first communication, wherein the first validation and enrichment protocol and the first micro-batch configuration file are specific to the first source. At pipeline 106, the second communication is directed to a second micro-batch (e.g., micro-batch 126) where a second micro-batch processing unit is configured to process, with a second micro-batch configuration file (e.g., micro-batch configuration file 116) and a second validation and enrichment protocol, the second communication, wherein the second validation and enrichment protocol and the second micro-batch configuration file are specific to the second source.

For example, at the first micro-batch (e.g., micro-batch 124), the first micro-batch configuration file (e.g., micro-batch configuration file 114) may parse the first alphanumeric data string for data errors and generate an entity query based on the data errors. These data errors may be specific to the source and/or the presence of these data errors may be compliant with the source. In such cases, a generic configuration file (e.g., batch configuration file 102) may have unnecessarily queried a source and/or other entity. While waiting for a response to this query, the system may have created an unnecessary bottleneck.

In some embodiments, the micro-batch configuration file (e.g., micro-batch configuration file 114) may include parameters and/or protocols specific to the source. For example, the first micro-batch configuration file (e.g., micro-batch configuration file 114) may retrieve data formatting parameters for the first source and may compare the first alphanumeric data string for the data formatting parameters. Additionally or alternatively, the system may perform specific procedures that are customized to the source. For example, the micro-batch configuration file (e.g., micro-batch configuration file 114) may parse the first alphanumeric data string for data errors and process the first alphanumeric data string using the first validation and enrichment protocol in response to detecting a data error.

In some embodiments, the first micro-batch configuration file (e.g., micro-batch configuration file 114) and/or the workflow (e.g., pipeline 104) corresponding to the first micro-batch (e.g., micro-batch 124) may have information available/accessible and/or the authorization to access/use that is not available to a generic configuration file (e.g., batch configuration file 102). For example, the system may determine a user profile for the first source corresponding to the first communication (e.g., information that is only available to the first source). The system may then retrieve user account data for the user profile, and the system may determine adjustments to the user account data based on the first communication.

For example, pipeline 106 may include processing unit 174, which may perform one or more operations related to processing a communication (e.g., a transaction file), determining eligibility of a user based on the communication, and/or calculating modifications to user account data (e.g., credit card rewards). For example, the rewards transactions may be written to a staging database (e.g., database 134), aggregated for updating the snapshot balance, and copied to the live databases for consumption by one or more application programming interfaces (e.g., via monitoring component 154). It should be noted that as referred to herein, a communication may include any electronic communication. In some embodiments, the communication may comprise information about a user credit card transaction.

In some embodiments, the first micro-batch configuration file (e.g., micro-batch 124) and/or the workflow (e.g., pipeline 104) corresponding to the first micro-batch (e.g., micro-batch 124) may have rights to write information that that is not available to a generic configuration file (e.g., batch configuration file 102). For example, the system may write user account data (e.g., only available to the first source) to a staging database (e.g., database 134). The system may then aggregate (e.g., at aggregator 144) the user account data to generate a status report (e.g., via monitoring component 154), and the system may copy the status report to live databases for consumption by application programming interfaces.

Figure 2A:
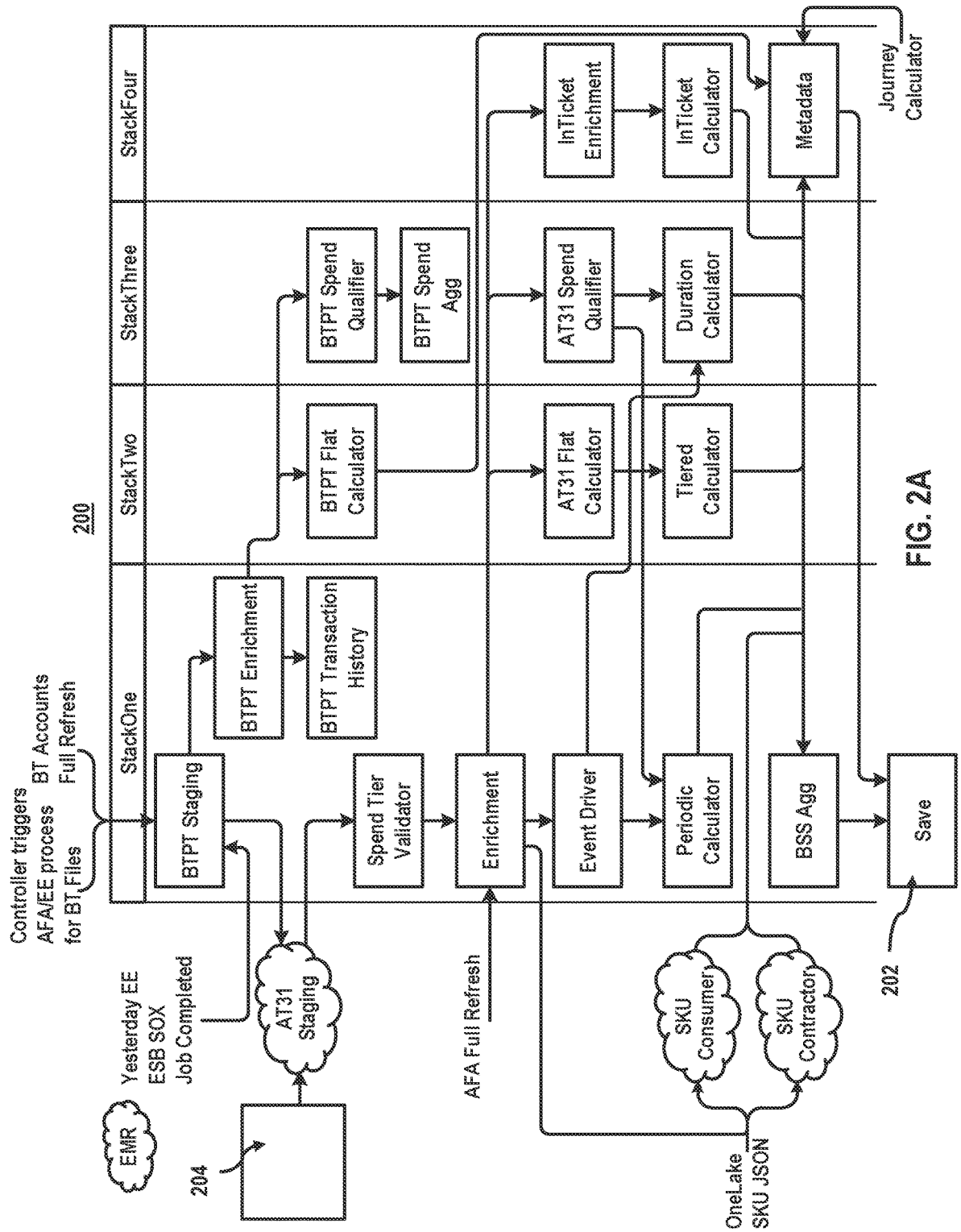
FIG. 2A shows an illustrative architecture for processing of communications using micro-batch processing using a validation and enrichment protocol and a micro-batch configuration file specific to a data source, in accordance with one or more embodiments.
Figure 2B:
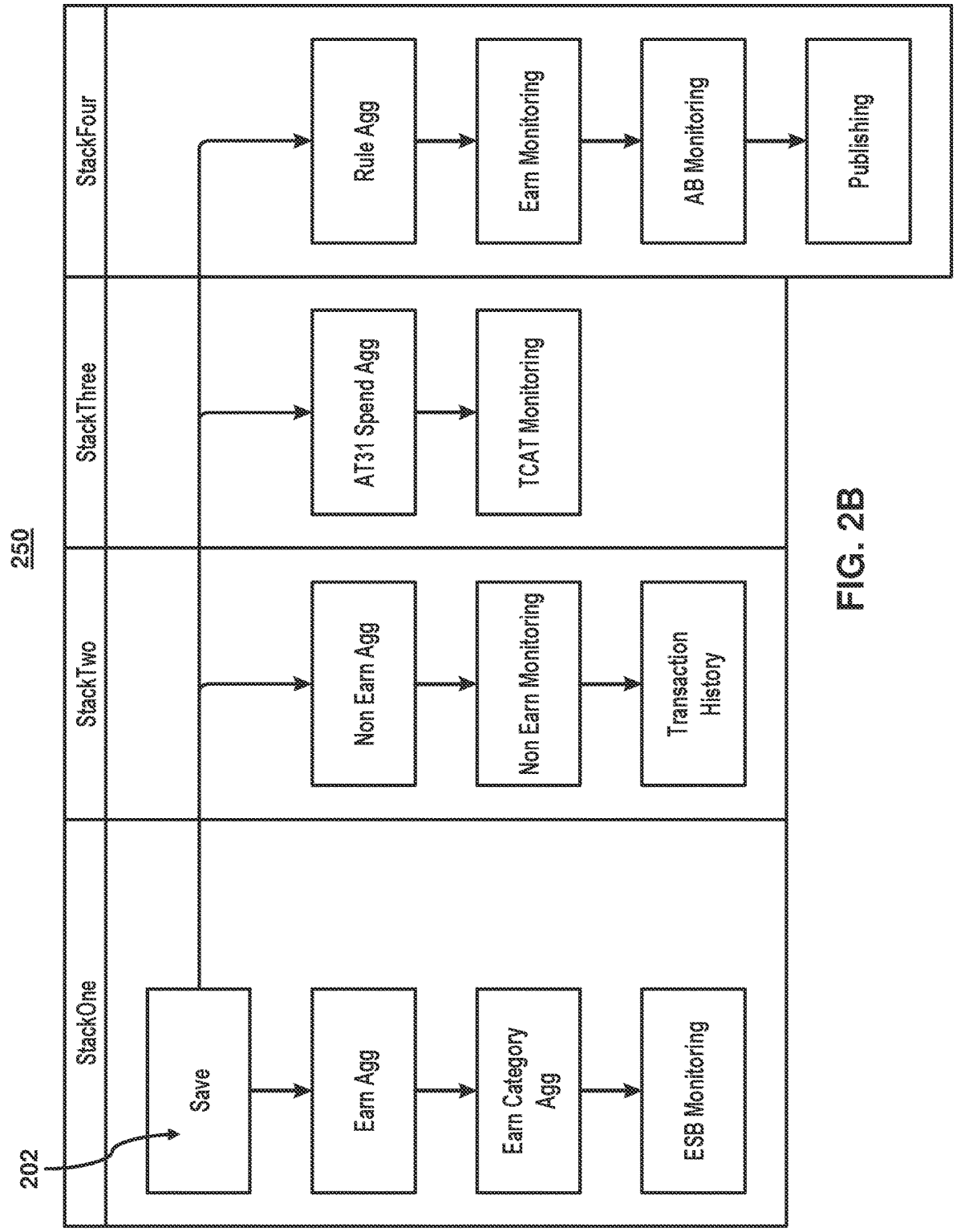
FIG. 2B shows a further illustrative architecture for processing of communications using micro-batch processing using a validation and enrichment protocol and a micro-batch configuration file specific to a data source, in accordance with one or more embodiments.

FIG. 2A shows an illustrative architecture for processing of communications using micro-batch processing using a validation and enrichment protocol and a micro-batch configuration file specific to a data source, in accordance with one or more embodiments. FIG. 2B shows a further illustrative architecture for processing of communications using micro-batch processing using a validation and enrichment protocol and a micro-batch configuration file specific to a data source, in accordance with one or more embodiments. For example, FIGS. 2A and B show a processing engine for determining perform one or more operations related to processing a communication (e.g., a transaction file), determining eligibility of a user based on the communication, and/or calculating modifications to user account data (e.g., credit card rewards). For example, the rewards transactions may be written to a staging database, aggregated for updating the snapshot balance, and copied to the live databases for consumption by one or more application programming interfaces.

FIGS. 2A-B show the workflow of a communication being processed from at a micro-batch workflow (e.g., pipeline 104 (FIG. 4)). System 200 of FIG. 2A and system 250 of FIG. 2B are connected at save point 202. FIGS. 2A-B also indicated various stacks (e.g., stack 1-4) that are used to process the communication.

For example, the system may receive a file (e.g., file 204) that has all communications in the micro-batch. This may include information about transactions such as the card swipes, payment info, etc. This file may also contain both rewards and non-rewards accounts (e.g., user profile and/or user account data). The micro-batch may arrive at one time a day.

The communication may then be processed through the various stacks. For example, at stack 1 the system may perform BTPT Staging. BTPT Staging involves using BTPT.dat file as input and processes each record in the file with a unique identifier. This job is dependent on the BT Accounts and the previous day's EE Earn Category Aggregator job.end file. BTPT Enrichment is used in order to preserve original data from BTPT file. The system avoids filtering out transactions and instead enriches them with more detail. Additionally, BTPT Transaction History saves each rewards-relevant transaction to Transaction History table for reconciliation for any account's activity. AT31 Staging assigns a unique identifier to each transaction. A Spend Tier Validator may confirm that for every spend-dependent rule for which today is the first day of that rule's window, the Spend Diff utility returns a total spend of $0. This job is triggered at the end of each predetermined period and may alert a user based on given rules.

During Enrichment, the system enriches transactions from AT31 file and may add information and populate Boolean flags to indicate earn eligibility and transaction history eligibility. Using the Event Driver, the system may find all accounts that have event-specific rules and determine which accounts should evaluated for each rule, and invoke the respective calculator with those accounts.

The system may also use a Periodic (Anniversary Bonus) Calculator to reward customers a bonus on their enrollment date. The system may use a BSS Aggregator to aggregate the current day's earn by account, sum up the total earn and write to the BSS aggregator table in preparation for updating the snapshot balance. At save point 202, the system may save staging data to live tables (customer facing), copy earn history staging to Earn History, and update an increment balance snapshot from snapshot staging into Account Snapshot.

The system may use an Earn Aggregator to aggregate the current day's earn transactions by account, points transaction type, and points type—write to the rewards points type aggregator tables. The system may use ESB (Periodic Calculator) Monitoring to ensure that all accounts that should have earned an ESB earned it at the correct amount and those that should not have earned did not earn and generate an alert if anything is out of compliance. The system may use an Earn Category Aggregator to consume Earn History Staging records.

At Stack 2, the system may use an AT31/BTPT Flat Calculator to perform calculations for each rule linked to each policy linked to each account. The system may use the earn style to determine if the earn amount is variable or fixed and/or write transactions to earn history staging. The system may write aggregated balance to snapshot staging.

The system may use a Tiered Calculator to perform calculations for each rule linked to each policy linked to each account and use the time period of the earn rule to fetch historic spend for that rule. Using that historic total, the system may determine which tier(s) the transactions apply towards, write transactions to earn history staging, write aggregated balance to snapshot staging.

The system may use Non-Earn Aggregator to aggregate the current day's non-earn activity by account, points transaction type, and points type and write to the rewards points type aggregator tables. The system may use Non Earn Monitoring to ensure that every account earned today is in an earnable status (currently flags every day with false positives). The system may use a Transaction History to save each rewards-relevant transaction to Transaction History table for reconciliation for any account's activity.

At Stack 3, the system may use a BTPT Spend Qualifier to confirm that all earn against tiered rules is split correctly based on historical spend against that rule. The system may use a BTPT Spend Aggregator to aggregate the current days spend activity by account and spend dependent rule and write to the spend agg tables. The system may use a AT31 Spend Qualifier to fetch all spend-dependent rules, the policies linked to those rules, and the accounts linked to those policies. The system may process the file for any transaction linked to any of those accounts and sum up the spend for all qualified transactions and save the totals by account and rule into a parquet file for downstream consumption. The system may use a Duration (ESB) Calculator to calculate spend for all rules that are ESB related and applies a bonus. Spend qualifications are met in the period of time defined (normally 99 days). The system may use a AT31 Spend Aggregator to aggregate the current day's spend activity by account and spend-dependent rule and write to the spend aggregator tables.

The system may use TCAT Monitoring to perform Monitoring calculations that only valid TCAT and TransCode combinations were awarded earn, and alert if anything is out of compliance.

At Stack 4, the system may use In-ticket-enrichment to perform join on AT31 and WIT files and pull only Walmart transactions and excludes non-Walmart transactions based on the purchase_channel. If join criteria that have not met from either AT31 or WIT files, the system directs those transactions will go to their respective AT31/WIT reprocess queues. The system may use an In-ticket-calculator to perform calculations for each rule linked to each policy linked to each account, and write earn transactions to earn history staging. The system may use a write updated balance to snapshot staging and filters out based on purchase-channel. The system may use a Metadata to collect data about the day's run and perform some "sanity check" validations and present metrics in dashboard. The system may use Rule Aggregator to aggregate the current day's spend and earn activity by rule and write to the earn rule aggregator history table. The system may use a Earn Monitoring to perform Monitoring earn calculations against the Rule Aggregator table and alert if anything is out of compliance. The system may use an AB (Anniversary Calculator) Monitoring to ensure that all accounts that should have earned an AB earned it at the correct amount and those that should not have earned did not earn. Alert if anything is out of compliance.

Figure 3:
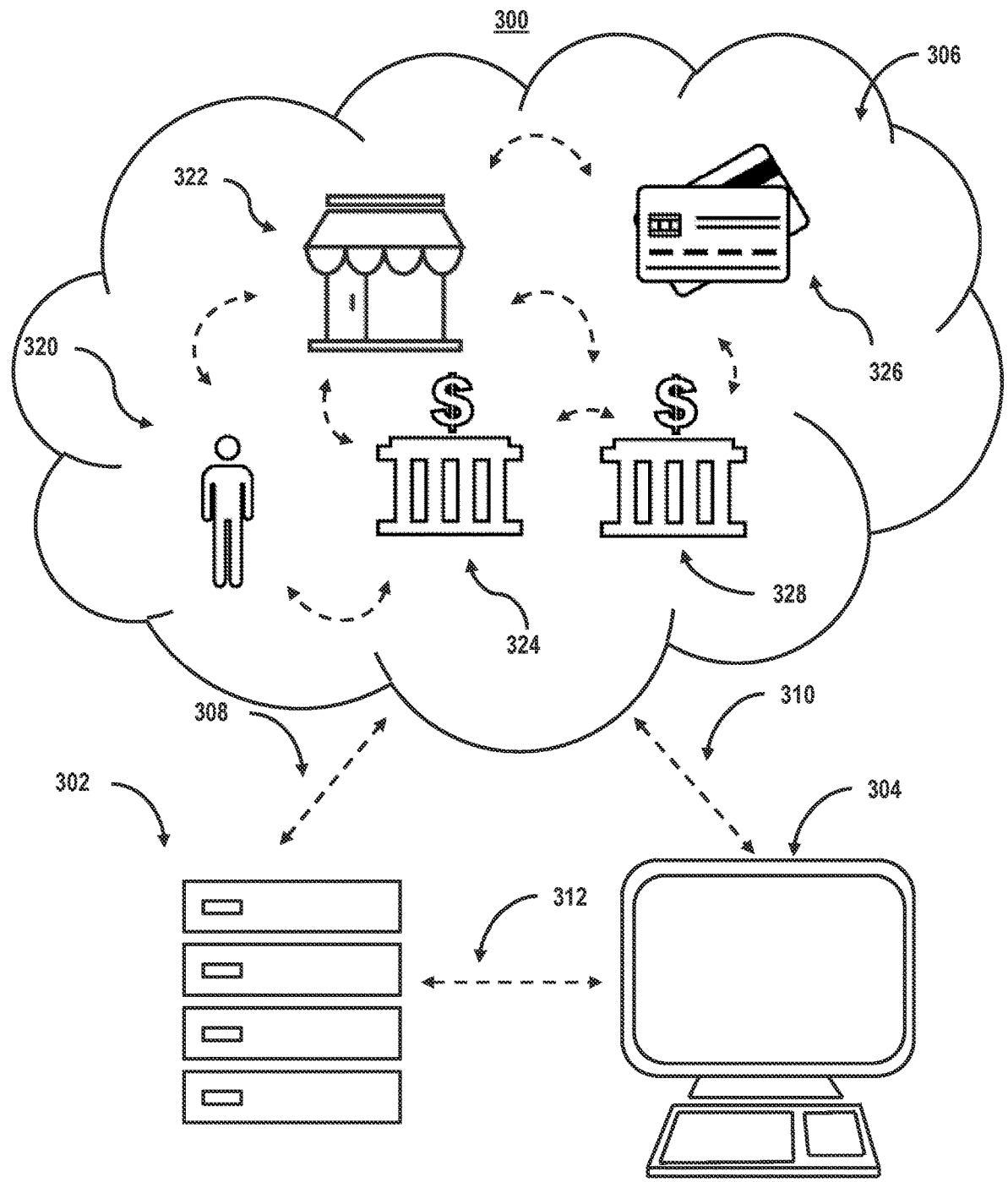
FIG. 3 shows illustrative system components related to parallel processing of batch communications, in accordance with one or more embodiments.

FIG. 3 shows illustrative system components related to parallel processing of batch communications, in accordance with one or more embodiments. As shown in FIG. 3, system 300 may include local server 302, user terminal 304, and cloud server 306. It should be noted that each component of system 300 may include additional subcomponents (e.g., additional servers and/or networks). System 300 may be used to process communications that may include user record data (e.g., data related to a transaction), resolve conflicts/corruptions, generate user queries, and/or compare source (e.g., merchant) data. It should be noted that server 302, user terminal 304, and server 306 may be any computing device, including, but not limited to, a laptop computer, a tablet computer, a hand-held computer, other computer equipment (e.g., a server), including "smart," wireless, wearable, and/or mobile devices. FIG. 3 also includes server 306. Server 306 may alternatively be any computing device as described above and may include any type of mobile terminal, fixed terminal, or other device. For example, server 306 may be implemented as a cloud computing system and may feature one or more component devices. It should also be noted that system 300 is not limited to three devices. Users may, for instance, utilize one or more other devices to interact with one another, one or more servers, or other components of system 300. It should be noted that, while one or more operations are described herein as being performed by particular components of system 300, those operations may, in some embodiments, be performed by other components of system 300. In some embodiments, the various computers and systems described herein may include one or more computing devices that are programmed to perform the described functions. Additionally, or alternatively, multiple users may interact with system 300 and/or one or more components of system 300. For example, in one embodiment, a first user (e.g., a credit card holder, aggregation service, credit provider, etc.) and a second user (e.g., a merchant/source, a credit card issuer, etc.) may interact with system 300 using two different components.

With respect to the components of server 302, user terminal 304, and server 306, each of these devices may receive content and data via input/output (hereinafter "I/O") paths. Each of these devices may also include processors and/or control circuitry to send and receive commands, requests, and other suitable data using the I/O paths and I/O circuitry. The control circuitry may comprise any suitable processing circuitry. Each of these devices may also include a user input interface and/or user output interface (e.g., a display) for use in receiving and displaying data. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to aggregating record data, resolving conflicts (e.g., either transmitting requests between components, receiving requests between components, and/or processing requests between components). For example, the processors may be programmed to provide information processing capabilities in the computing devices. As such, the processors may include one or more digital processors, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 3 also includes communication paths 308, 310, and 312. Communication paths 308, 310, and 312 may include the Internet, a mobile phone network, a mobile voice, or data network (e.g., a 5G or LTE network), a cable network, a public switched telephone network, or other types of communications network or combinations of communications networks. Communication paths 308, 310, and 312 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Server 306 may be a database configured to store user data, process communications, record data, and/or process requests for aggregating of user record data, resolving conflicts, generating user queries, and/or comparing source data. For example, the database may include user record data that the system has collected about the user through prior transactions. Alternatively, or additionally, the system may act as a clearing house for multiple sources of information about the user. Server 306 may also include control circuitry configured to perform the various operations needed to verify the identity of a user through contextual knowledge-based authentication.

In some embodiments, a request to process communications, authenticate transactions, aggregate user record data, resolve conflicts, generate user queries, compare source data, and/or generate similarity metrics may be structured as an API request that includes a URL, body, and method. The API request may correspond to one half of the API request-response cycle between one or more devices and/or applications to complete the request. For example, the system may communicate in HTTP (Hyper Text Transfer Protocol) through a request-response cycle.

These requests may also direct a batch of communication to a batch processing unit. To make a valid request, the requester (e.g., server 302) may include a URL (Uniform Resource Locator), method, list of headers, and/or body. The URL may indicate to server 306 (or other component) what resources to use. The body may contain headers and data. The headers may provide metadata about the request (e.g., the name of the requester, the user account for which access is needed, etc.) and the body may indicate the name of the user for which a request relates.

System 300 may be used for aggregating user record data, resolving conflicts, generating user queries, comparing source data, and/or generating similarity metrics. One component may be an application running on a mobile device of a user. As referred to herein, user record data and/or user account data may include any data related to a transaction. For example, the record data may include a paper or electronic record containing information about the transaction, such as transaction amount, transaction number, transaction date and time, transaction type (deposits, withdrawal, purchase or refund), type of account being debited or credited, card number, identity of the card acceptor (e.g., merchant/source, including source address, identification or serial number, and/or terminal (e.g., name from which the terminal operates)). However, this information may be transmitted in a continuous text string. Continuous data may be data which can take any values.

Another component of the system shown in FIG. 3 is user terminal 304. User terminal 304 may allow a user to access and/or submit information for parallel processing of batch communications. User terminal 304 may also generate for display user queries (e.g., such as user query 314 and user query 316). The various components of system 300 may work in conjunction to create a credit card transaction eco-system.

For example, system 300 may involve multiple components and involve requests from one or more entities such as cardholder 320. A cardholder 320 may include a user that accesses an aggregation service in order to aggregate transactions of that user. For example, a given user may have multiple credit card accounts and thus correspond to a cardholder for multiple credit card networks. It should be noted that as referred to herein a credit card network may include debit cards, e-commerce accounts, source credit, and other electronic payment and/or monetary systems, such as online user currency accounts, cryptocurrencies, credit provider accounts, gift card accounts, etc.

System 300 may also include source 322, which may be associated with a store and/or vendor that sells goods and/or services to the cardholder. As referred to herein, a source may include a data source and/or correspond to a data source of one or more communications. Source 322, which may be a merchant, may accept credit card payments. Source 322 may also send card and/or user account information to, and request payment authorization from, an issuing bank of cardholder 320. Source 322 may be assigned information by a network upon registration. That information may include a merchant/source ID, a network name, and an address. The network may further generate a cleansed network name based on a native network name (e.g., a network name based on a proprietary and/or non-public algorithm for generating a network name based on available data of a merchant when the merchant registers with the network).

For example, as part of a request, a communication from a source (or data source) may include various information about a communication:

Merchant ID: 12345
Network Name: Josh's Board Game Store
Address: 1234 Main St. City, State 12346

However, due to the conversion of the information in the communication as it traverses the various components shown in FIG. 3, the information may be transmitted in a continuous data string that may or may not be human-readable. Source 322 may include an acquiring bank 324, which may also comprise an acquiring processor or service provider. For example, the acquiring bank may receive payment authorization requests from source 322 and send them to issuing bank 328 (which may include, or be a separate entity from, acquiring bank 324). The acquiring bank 324 may then relay a response from issuing bank 328 to source 322. In some embodiments, acquiring bank 324 may be a third-party entity. Acquiring bank 324 may provide a service or device that allows source 322 to accept credit cards as well as send credit card payment details to network 326. Upon receipt, network 326 may forward the payment authorization back to acquiring bank 324.

Network 326 may include entities that operate credit card networks that process credit card payments worldwide and govern interchange fees. In some embodiments, issuing bank 328 may form part of network 326. For example, issuing bank 328 may be a financial institution that issued the credit card involved in the transaction. Issuing bank 328 may receive the payment authorization request from the credit card network and either approve or decline the transaction.

During processing, the components of system 300 may use multiple naming conventions, format, and value types of a category, value, etc. and these may differ from that of the user profile data (as stored on a user device or financial service provider), server 306 (or other component of system 300) may use matching algorithms that may support exact match techniques and/or partial or "fuzzy" matching logic (e.g., searching for a closest or partial match) to locate alternate spellings, naming conventions, etc. for categories and/or value. For example, a column name associated with user data stored by an aggregation service may be compared to a category and/or value for the issuing bank 328. In another example, metadata associated with user data stored by a financial service provider (e.g., describing a transaction in the account of the user) may be compared to metadata of a corresponding record, entry, category, and/or value for the issuing bank 328.

In some embodiments, system 300 may compare data between system components during a transaction and/or communication. For example, credit card transactions are processed through a variety of platforms, including brick-and-mortar stores, e-commerce stores, wireless terminals, and phone or mobile devices. The entire authorization cycle takes within two to three seconds, and the transaction process includes three stages of authorization, clearing, and settlement, in which clearing and settlement may take place simultaneously. In an authorization stage, source 322 must obtain approval for payment from issuing bank 328. Source 322 may transmit record data that may include: a credit card number, card expiration date, billing address (e.g., for address verification system ("AVS")), a validation card security code ("CVV"), and/or a payment amount.

As the transaction moves through system 300, issuing bank 328 may receive the payment authorization request from network 326. Issuing bank 328 validates the credit card number, checks the amount of available funds, matches the billing address to the one on file and validates the CVV number. Issuing bank 328 approves, or declines, the transaction and sends back an appropriate response to source 322 through system 300 (e.g., via network 326 and/or acquiring bank 324). Source 322 may receive the authorization, and issuing bank 328 may place a hold in the amount of the purchase on the account of cardholder 320. A point-of-sale terminal (e.g., user terminal 304) may send all approved authorizations to be processed in a "batch" (e.g., at the end of a day, accounting period, etc.). Notably, transmitting authorizations in batches increases the need for accurate and precise data and/or conflict resolutions at a high rate of speed.

During the clearing stage, the transaction is posted to both a credit card account of cardholder 320 and source 322. Source 322 then sends the approved authorizations in a batch to acquiring bank 324. Acquiring bank 324 then routes the batched information to network 326 for settlement. Network 326 forwards each approved transaction to an appropriate issuing bank 328. Issuing bank 328 will transfer the funds and may withhold exchange fees. Network 326 may also pay acquiring bank 324 a fee. Issuing bank may then post the user record data to an account of cardholder 320.

Thus, a single transaction includes multiple systems each interacting with each other and handling user data that must be stored, transmitted, and verified in a precise manner. In order to ensure precision, each system and/or component of a system may use its own (and in many cases proprietary) encoding mechanisms. Additionally, or alternatively, source 322, acquiring bank 324, network 326, and/or issuing bank 328 each transmit a network name (e.g., an identification system used by an assigning party to indicate a source (e.g., source 322) corresponding to a transaction). However, as each system may use a private (and likely proprietary) algorithm for facilitating transactions, a network name generated and used by one component (e.g., network 326) may not be the same as the network name used by another network.

In some embodiments, other information may vary as well. For example, information about a source (e.g., address) may not be updated and/or correspond to a particular location, corporate headquarters, or other address for all transactions with the source. Likewise, time stamp information may be transmitted in different formats (or correspond to different time zones). Payment information may have slight variations due to fees charged by different system components. In such cases, the system may reconstitute the original charge made by the user (e.g., cardholder 320) based on exchange fee information.

Network name data is also not meant to be human readable. That is, network name data is generated along with the proprietary security algorithms used by different system components, and this network name data may comprise a string of alphanumeric characters and/or other symbols that is used by each individual system component. The network name may be routinely encrypted, decrypted, and/or subject to different proprietary algorithms for generating and translating data such that its original data value (e.g., a name of a source if the value was even originally based on the name of the source) may be irretrievable. As a benefit to human users, some credit card issuers and banks may cleanse this data in order to make it human readable. That is, the credit card issuers and/or banks may apply a proprietary algorithm to make network name or other source data more human readable.

Figure 4:
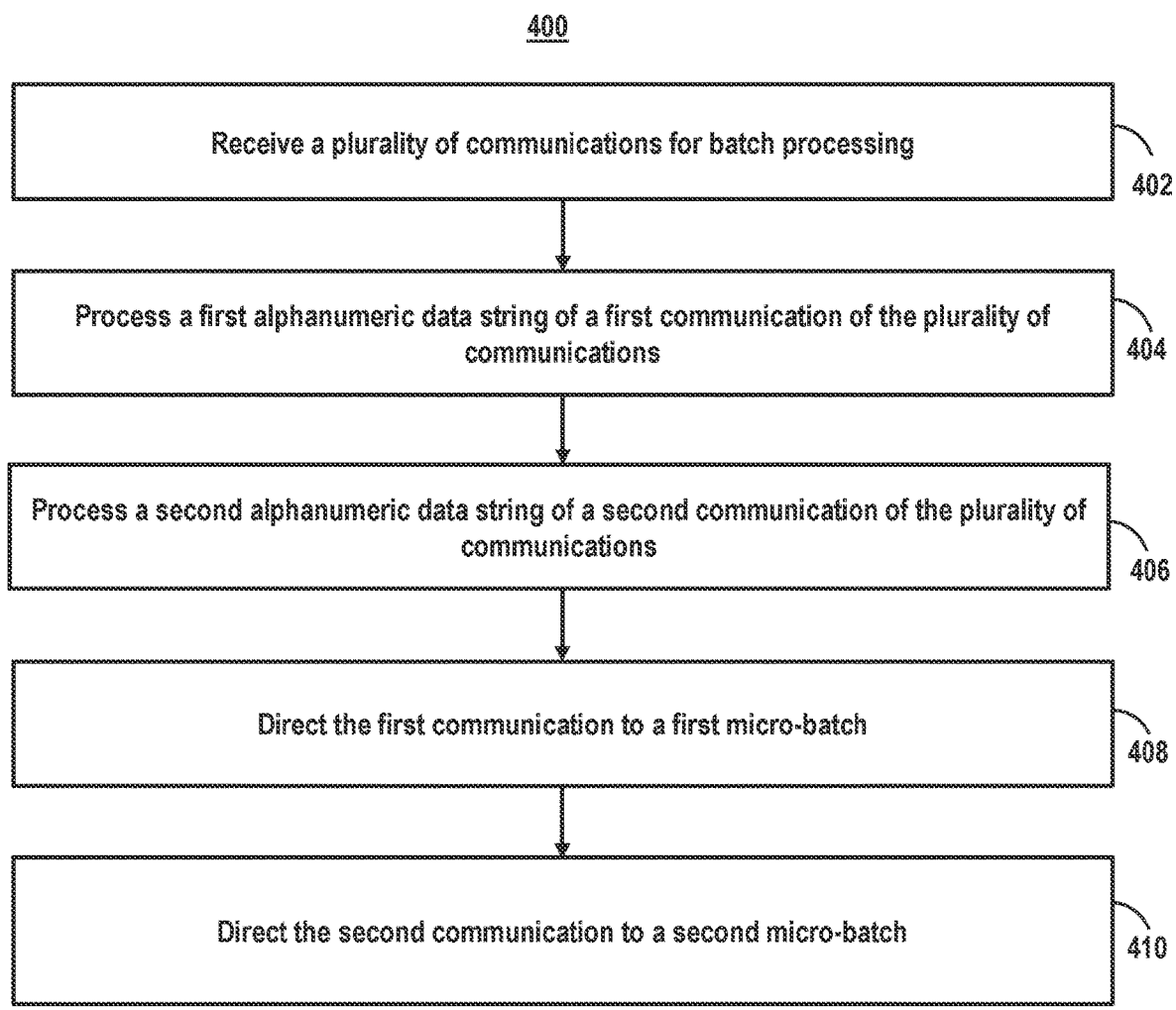
FIG. 4 shows a flowchart of the steps involved in parallel processing of batch communications during data validation, in accordance with one or more embodiments.

FIG. 4 shows a flowchart of the steps involved in parallel processing of batch communications during data validation, in accordance with one or more embodiments. For example, process 400 may be used to performing parallel processing of a batch of communications (e.g., credit card transactions) through the use of a plurality of micro-batches arranged in parallel, in which each micro-batch corresponds to a specific data source (e.g., a merchant). The micro-batch may in turn be processed to determine user specific rewards (e.g., using the processing engines described in FIGS. 2A and B.

At step 402, process 400 receives (e.g., by control circuitry of one or more of the components in FIG. 3) a plurality of communications for batch processing. For example, the system may receive a plurality of communications for batch processing during a predetermined time period. The plurality of communications may correspond to communications that need to be submitted to a third party entity for batch processing at the predetermined time period.

For example, the plurality of communications may include communications from numerous sources (e.g., numerous merchants and/or other entities as described in FIG. 3 above). These sources may include the first source and the second source, wherein each communication of the plurality of communications comprises a respective alphanumeric data string, and wherein each communication of the plurality of communications comprises a respective alphanumeric data string encoded in proprietary formats for the first source or the second source. For example, as the communications traverse a processing network (e.g., as described in FIG. 3), the communication may be altered, converted, and/or modified.

At step 404, process 400 processes (e.g., by control circuitry of one or more of the components in FIG. 3) a first alphanumeric data string of a first communication of the plurality of communications. For example, the system may process, with a batch configuration file, a first alphanumeric data string of a first communication of the plurality of communications. The batch configuration file may determine that the first communication is received from a first source, determine a first time stamp for the first communication that corresponds to the predetermined time period, and/or generate a first metadata tag for the first communication, wherein the first metadata tag indicates that the first communication corresponds to the first source and the first time stamp.

For example, the system may generate a first sourcefieldID for the first communication based on the batch configuration file. The sourcefieldID may comprise a metadata tag that is based on source of the communication and a time (e.g., corresponding to the first time stamp) at which the communication was received. However, in order to ensure the integrity of the communication and in order to prevent corruption, the metadata tag may not alter any information in the underlying communication. Furthermore, as the metadata tag is based on the time stamp, the metadata tag may indicate a batch or a processing time required for the communication. Accordingly, the system may direct the communication away from an original batch and to another micro-batch with risking that the communication will not be processed during the predetermined time (e.g., which may be set by a user, third-party entity, or system requirements).

For example, in some embodiments, the predetermined processing time may be variable. For example, to determine the predetermined time the system may determine a number of the plurality of communications received. The system compares the number to a threshold number. In response to the number equaling or exceeding the threshold number, the system may determine a current date. The system may then determine the predetermined time period based on the current date.

In some embodiments, the system may parse the first alphanumeric data string for a first tag property corresponding to a communication source to determine that the first communication is received from the first source. The system may parse the first alphanumeric data string for a second tag property corresponding to a batch time stamp to determine the first time stamp for the second communication that corresponds to the predetermined time period. The system may then process the first tag property and the second tag property to generate the first metadata tag for the first communication.

At step 406, process 400 processes (e.g., by control circuitry of one or more of the components in FIG. 3) a second alphanumeric data string of a second communication of the plurality of communications. For example, the system may process, with the batch configuration file, a second alphanumeric data string of a second communication of the plurality of communications. The batch configuration file may determine that the second communication is received from a second source, determine a second time stamp for the second communication that corresponds to the predetermined time period, and/or generate a second metadata tag for the second communication, wherein the second metadata tag indicates that the second communication corresponds to the second source and the second time stamp.

Similarly as stated above, the system may generate a second sourcefieldID for the second communication based on the batch configuration file. The sourcefieldID may comprise a metadata tag that is based on source of the communication and a time (e.g., corresponding to the second time stamp) at which the communication was received. However, in order to ensure the integrity of the communication and in order to prevent corruption, the metadata tag may not alter any information in the underlying communication. Furthermore, as the metadata tag is based on the time stamp, the metadata tag may indicate a batch or a processing time required for the communication. Accordingly, the system may direct the communication away from an original batch and to another micro-batch with risking that the communication will not be processed during the predetermined time (e.g., which may be set by a user, third-party entity, or system requirements).

Additionally, as the system uses the dame configuration file for generating both the first and second metadata tag any updates for the system may be made through modifying the same configuration file increasing efficiency. In some embodiments, the configuration file may reference another configuration file (e.g., an update to the configuration file) as new sources are validated in the system. By doing so, the system may scale its processes without any down time and/or affecting other processing workflows (e.g., corresponding to other micro-batches and/or sources).

At step 408, process 400 directs (e.g., by control circuitry of one or more of the components in FIG. 3) the first communication to a first micro-batch for processing within the predetermined time period based on the first metadata tag. For example, the system may direct the first communication to a first micro-batch for processing within the predetermined time period based on the first metadata tag, wherein the first micro-batch is processed using a first validation and enrichment protocol and a first micro-batch configuration file, wherein the first validation and enrichment protocol and the first micro-batch configuration file are specific to the first source.

For example, at the first micro-batch, the first micro-batch configuration file may parse the first alphanumeric data string for data errors and generate an entity query based on the data errors. These data errors may be specific to the source and/or the presence of these data errors may be compliant with the source. In such cases, a generic configuration file (e.g., a batch configuration file that is not specific to a source) may have unnecessarily queried a source and/or other entity. While waiting for a response to this query, the system may have created an unnecessary bottleneck.

In some embodiments, the micro-batch configuration file may include parameters and/or protocols specific to the source. For example, the first micro-batch configuration file may retrieve data formatting parameters for the first source and may compare the first alphanumeric data string for the data formatting parameters. Additionally or alternatively, the system may perform specific procedures that are customized to the source. For example, the micro-batch configuration file may parse the first alphanumeric data string for data errors and process the first alphanumeric data string using the first validation and enrichment protocol in response to detecting a data error.

In some embodiments, the first micro-batch configuration file and/or the workflow corresponding to the first micro-batch may have information available/accessible and/or the authorization to access/use that is not available to a generic configuration file. For example, the system may determine a user profile for the first source corresponding to the first communication (e.g., information that is only available to the first source). The system may then retrieve user account data for the user profile, and the system may determine adjustments to the user account data based on the first communication.

In some embodiments, the first micro-batch configuration file and/or the workflow corresponding to the first micro-batch may have rights to write information that that is not available to a generic configuration file. For example, the system may write user account data (e.g., only available to the first source) to a staging database (e.g., controlled by the first source). The system may then aggregate the user account data to generate a status report, and the system may copy the status report to live databases for consumption by application programming interfaces.

At step 410, process 400 directs (e.g., by control circuitry of one or more of the components in FIG. 3) the second communication to a second micro-batch for processing within the predetermined time period based on the second metadata tag. For example, the system may direct the second communication to a second micro-batch for processing within the predetermined time period based on the second metadata tag, wherein the second micro-batch is processed using a second validation and enrichment protocol and a second micro-batch configuration file, wherein the second validation and enrichment protocol and the second micro-batch configuration file are specific to the second source.

For example, the system may perform one or more functions as described above in relation to step 408, but may use a different configuration file. For example, the configuration file and/or a validation and enrichment protocol may be specific to the second source and/or workflow.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIG. 3 could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving a plurality of communications for batch processing during a predetermined time period; processing, with a batch configuration file, a first alphanumeric data string of a first communication of the plurality of communications, wherein the batch configuration file: determines that the first communication is received from a first source; determines a first time stamp for the first communication that corresponds to the predetermined time period; and generates a first metadata tag for the first communication, wherein the first metadata tag indicates that the first communication corresponds to the first source and the first time stamp; processing, with the batch configuration file, a second alphanumeric data string of a second communication of the plurality of communications, wherein the batch configuration file: determines that the second communication is received from a second source; determines a second time stamp for the second communication that corresponds to the predetermined time period; and generates a second metadata tag for the second communication, wherein the second metadata tag indicates that the second communication corresponds to the second source and the second time stamp; directing the first communication to a first micro-batch for processing within the predetermined time period based on the first metadata tag, wherein the first micro-batch is processed using a first validation and enrichment protocol and a first micro-batch configuration file, wherein the first validation and enrichment protocol and the first micro-batch configuration file are specific to the first source; and directing the second communication to a second micro-batch for processing within the predetermined time period based on the second metadata tag, wherein the second micro-batch is processed using a second validation and enrichment protocol and a second micro-batch configuration file, wherein the second validation and enrichment protocol and the second micro-batch configuration file are specific to the second source.
2. The method of embodiment 1, wherein the plurality of communications includes communications from the first source and the second source, wherein each communication of the plurality of communications comprises a respective alphanumeric data string, and wherein each communication of the plurality of communications comprises a respective alphanumeric data string encoded in proprietary formats for the first source or the second source.
3. The method of anyone of the preceding embodiments, wherein the batch configuration file: parses the first alphanumeric data string for a first tag property corresponding to a communication source to determine that the first communication is received from the first source; parses the first alphanumeric data string for a second tag property corresponding to a batch time stamp to determine the first time stamp for the second communication that corresponds to the predetermined time period; and processes the first tag property and the second tag property to generate the first metadata tag for the first communication.
4. The method of anyone of the preceding embodiments, further comprising: determining a number of the plurality of communications received; comparing the number to a threshold number; in response to the number equaling or exceeding the threshold number, determining a current date; and determining the predetermined time period based on the current date.
5. The method of anyone of the preceding embodiments, wherein the first micro-batch configuration file: parses the first alphanumeric data string for data errors; and generates an entity query based on the data errors.
6. The method of anyone of the preceding embodiments, wherein the first micro-batch configuration file: parses the first alphanumeric data string for data errors; and generates an entity query based on the data errors.
7. The method of anyone of the preceding embodiments, wherein the first micro-batch configuration file: retrieves data formatting parameters for the first source; and compares the first alphanumeric data string for the data formatting parameters.
8. The method of anyone of the preceding embodiments, wherein the first micro-batch configuration file: parses the first alphanumeric data string for data errors; and processes the first alphanumeric data string using the first validation and enrichment protocol in response to detecting a data error.
9. The method of anyone of the preceding embodiments, wherein the first micro-batch is processed by: determining a user profile for the first source corresponding to the first communication; retrieving user account data for the user profile; and determining adjustments to the user account data based on the first communication.
10. The method of claim 2, wherein the first micro-batch is processed by: writing user account data to a staging database; aggregating the user account data to generate a status report; and copying the status report to live databases for consumption by application programming interfaces.
11. A tangible, non-transitory, machine-readable, medium storing instruction that, when executed by a data processing apparatus, causes the data processing apparatus to perform operations comprising those of any of embodiments 1-10.

12. A system comprising: one or more processors and memory storing instructions that, when executed by the processors, cause the processors to effectuate operations comprising those of any of embodiments 1-10.

13. A system comprising means for performing any of embodiments 1-10.

What is claimed is:

1. A method for parallel processing of batch communications during data validation using a plurality of independent processing streams, the method comprising:
receiving a plurality of communications for batch processing during a predetermined time period;
processing, with a batch configuration file, a first alphanumeric data string of a first communication of the plurality of communications, wherein the batch configuration file:
determines that the first communication is received from a first source;
determines a first time stamp for the first communication that corresponds to the predetermined time period; and
generates a first metadata tag for the first communication, wherein the first metadata tag indicates that the first communication corresponds to the first source and the first time stamp;
processing, with the batch configuration file, a second alphanumeric data string of a second communication of the plurality of communications, wherein the batch configuration file:
determines that the second communication is received from a second source;
determines a second time stamp for the second communication that corresponds to the predetermined time period; and
generates a second metadata tag for the second communication, wherein the second metadata tag indicates that the second communication corresponds to the second source and the second time stamp;
directing the first communication to a first micro-batch for processing within the predetermined time period based on the first metadata tag, wherein the first micro-batch is processed using a first validation and enrichment protocol and a first micro-batch configuration file, wherein the first validation and enrichment protocol and the first micro-batch configuration file are specific to the first source; and
directing the second communication to a second micro-batch for processing within the predetermined time period based on the second metadata tag, wherein the second micro-batch is processed using a second validation and enrichment protocol and a second micro-batch configuration file, wherein the second validation and enrichment protocol and the second micro-batch configuration file are specific to the second source.

2. The method of claim 1, wherein the plurality of communications includes communications from the first source and the second source, wherein each communication of the plurality of communications comprises a respective alphanumeric data string, and wherein each communication of the plurality of communications comprises a respective alphanumeric data string encoded in proprietary formats for the first source or the second source.

3. The method of claim 1, wherein the batch configuration file:

parses the first alphanumeric data string for a first tag property corresponding to a communication source to determine that the first communication is received from the first source;
parses the first alphanumeric data string for a second tag property corresponding to a batch time stamp to determine the first time stamp for the second communication that corresponds to the predetermined time period; and
processes the first tag property and the second tag property to generate the first metadata tag for the first communication.

4. The method of claim 1, further comprising:
determining a number of the plurality of communications received;
comparing the number to a threshold number;
in response to the number equaling or exceeding the threshold number, determining a current date; and
determining the predetermined time period based on the current date.

5. The method of claim 1, wherein the first micro-batch configuration file:
parses the first alphanumeric data string for data errors; and
generates an entity query based on the data errors.

6. The method of claim 1, wherein the first micro-batch configuration file:
parses the first alphanumeric data string for data errors; and
generates an entity query based on the data errors.

7. The method of claim 1, wherein the first micro-batch configuration file:
retrieves data formatting parameters for the first source; and
compares the first alphanumeric data string for the data formatting parameters.

8. The method of claim 1, wherein the first micro-batch configuration file:
parses the first alphanumeric data string for data errors; and
processes the first alphanumeric data string using the first validation and enrichment protocol in response to detecting a data error.

9. The method of claim 1, wherein the first micro-batch is processed by:
determining a user profile for the first source corresponding to the first communication;
retrieving user account data for the user profile; and
determining adjustments to the user account data based on the first communication.

10. The method of claim 1, wherein the first micro-batch is processed by:
writing user account data to a staging database;
aggregating the user account data to generate a status report; and
copying the status report to live databases for consumption by application programming interfaces.

11. The method of claim 1, wherein the plurality of communications includes communications from the first source and the second source, wherein each communication of the plurality of communications comprises a respective alphanumeric data string, and wherein each communication of the plurality of communications comprises a respective alphanumeric data string encoded in proprietary formats for the first source or the second source.

12. The non-transitory, computer readable medium of claim 11, wherein the first micro-batch configuration file:

parses the first alphanumeric data string for data errors; and processes the first alphanumeric data string using the first validation and enrichment protocol in response to detecting a data error.

13. A non-transitory, computer readable medium for parallel processing of batch communications during data validation using a plurality of independent processing streams comprising instructions when executed by one or more processors causes operations comprising:

receiving a plurality of communications for batch processing during a predetermined time period;

processing, with a batch configuration file, a first alphanumeric data string of a first communication of the plurality of communications, wherein the batch configuration file:

determines that the first communication is received from a first source;

determines a first time stamp for the first communication that corresponds to the predetermined time period; and generates a first metadata tag for the first communication, wherein the first metadata tag indicates that the first communication corresponds to the first source and the first time stamp;

processing, with the batch configuration file, a second alphanumeric data string of a second communication of the plurality of communications, wherein the batch configuration file:

determines that the second communication is received from a second source;

determines a second time stamp for the second communication that corresponds to the predetermined time period; and generates a second metadata tag for the second communication, wherein the second metadata tag indicates that the second communication corresponds to the second source and the second time stamp;

directing the first communication to a first micro-batch for processing within the predetermined time period based on the first metadata tag, wherein the first micro-batch is processed using a first validation and enrichment protocol and a first micro-batch configuration file, wherein the first validation and enrichment protocol and the first micro-batch configuration file are specific to the first source; and directing the second communication to a second micro-batch for processing within the predetermined time period based on the second metadata tag, wherein the second micro-batch is processed using a second validation and enrichment protocol and a second micro-batch configuration file, wherein the second validation and enrichment protocol and the second micro-batch configuration file are specific to the second source.

14. The non-transitory, computer readable medium of claim 13, wherein the batch configuration file:

parses the first alphanumeric data string for a first tag property corresponding to a communication source to determine that the first communication is received from the first source;

parses the first alphanumeric data string for a second tag property corresponding to a batch time stamp to determine the first time stamp for the second communication that corresponds to the predetermined time period; and processes the first tag property and the second tag property to generate the first metadata tag for the first communication.

15. The non-transitory, computer readable medium of claim 13, wherein the instructions further cause operations comprising:

determining a number of the plurality of communications received;

comparing the number to a threshold number;

in response to the number equaling or exceeding the threshold number, determining a current date; and determining the predetermined time period based on the current date.

16. The non-transitory, computer readable medium of claim 13, wherein the first micro-batch configuration file:

parses the first alphanumeric data string for data errors; and generates an entity query based on the data errors.

17. The non-transitory, computer readable medium of claim 13, wherein the first micro-batch configuration file:

parses the first alphanumeric data string for data errors; and generates an entity query based on the data errors.

18. The non-transitory, computer readable medium of claim 13, wherein the first micro-batch configuration file:

retrieves data formatting parameters for the first source; and compares the first alphanumeric data string for the data formatting parameters.

19. The non-transitory, computer readable medium of claim 13, wherein the first micro-batch is processed by:

determining a user profile for the first source corresponding to the first communication;

retrieving user account data for the user profile; and determining adjustments to the user account data based on the first communication.

* * * * *